United States Patent [19]
Jasinski

[11] 3,771,401
[45] Nov. 13, 1973

[54] SHEETMETAL SHEARING APPARATUS

[76] Inventor: Donald W. Jasinski, 4880 Eva St., Saginaw, Mich.

[22] Filed: Jan. 10, 1972

[21] Appl. No.: 216,381

[52] U.S. Cl.................. 83/453, 83/563, 83/622, 83/636, 83/679, 83/694, 83/920
[51] Int. Cl............................................ B26d 7/02
[58] Field of Search................ 83/636, 563, 564, 83/566, 569, 557, 622, 688, 689, 694, 658, 660, 652, 679, 682, 451, 453, 455, 459, 466.1

[56] References Cited
UNITED STATES PATENTS

| | | | |
|---|---|---|---|
| 2,776,003 | 1/1957 | Koster | 83/636 X |
| 3,269,239 | 8/1966 | Dixon | 83/679 X |
| 3,134,285 | 5/1964 | Green | 83/920 X |
| 3,039,343 | 6/1962 | Richards | 83/622 X |

Primary Examiner—Andrew R. Juhasz
Assistant Examiner—W. D. Bray
Attorney—Learman & McCulloch

[57] ABSTRACT

Apparatus for shearing a sheetmetal wall panel having a lateral flange portion overlying a portion of the panel base, the apparatus including a support die conforming to the contour of one side of the panel, a serrated cutting bar transversely movable toward and away from the die and the other side of the panel to initially pierce and then laterally, cut the panel in opposite directions at the same time, and a flange supporting block member movable between a remote, inoperative position and an operative position underlying the flange to prevent the flange from being distorted when it is being cut.

17 Claims, 8 Drawing Figures

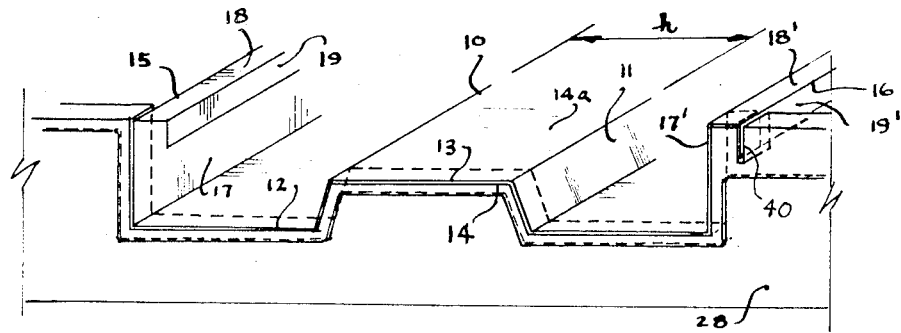
Fig 7
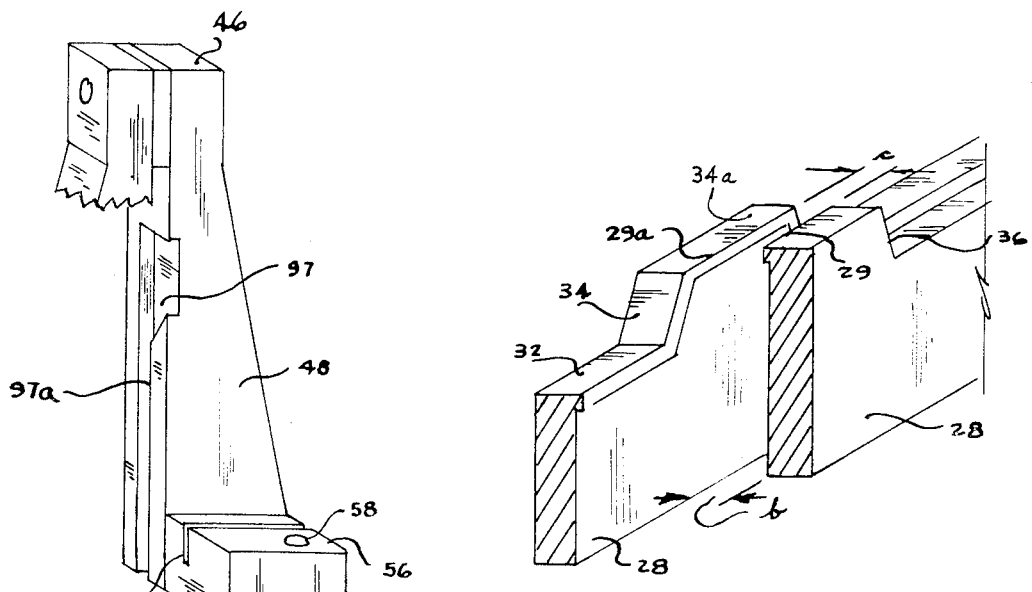
Fig 5
Fig 6
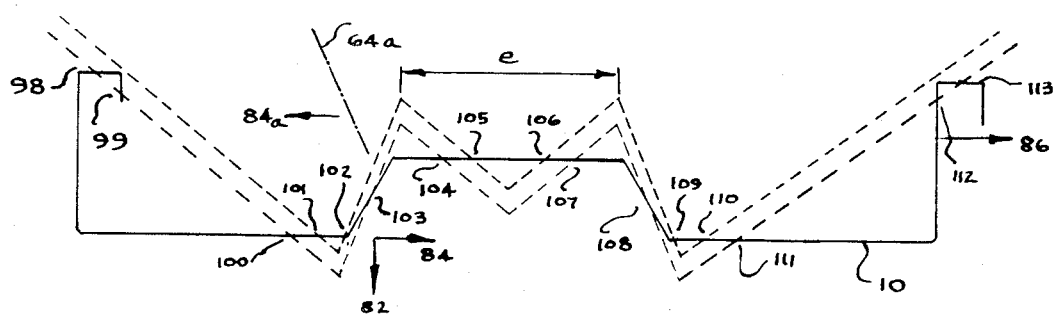
Fig 8

SHEETMETAL SHEARING APPARATUS

FIELD OF THE INVENTION

This invention relates to sheetmetal shearing apparatus, and more particularly to a new and improved cutting blade for laterally shearing a panel, and new and improved apparatus for supporting the panel as it is being cut.

BACKGROUND OF THE INVENTION

Many different devices have been provided for cutting sheetmetal, however, the known devices are all of the type which require a relatively long time and the exertion of considerable force to cut a given piece of material. Accordingly, it is an object of the present invention to provide sheetmetal cutting apparatus which can be quickly operated with minimal force.

Decorative sheetmetal wall paneling is now available in various shapes and with various contours to provide appropriate decorative effects. The opposite lateral sides of such decorative panels are provided with mating tongue and groove members so that when the panels are installed adjacent each other, the tongue on one panel is received in the groove of the adjacent panel. Such contoured and flanged panels cannot be conveniently cut with conventional cutting mechanism. It is customary to manually cut sheetmetal wall panels with a hand-operated saw which is dangerous to operate and relatively slow and the resulting cut edge is generally ragged and must be filed prior to the panel being installed. In addition, the heat generated during the sawing operation will sometimes scorch the paint on a panel which must then be repainted prior to installation. The prior manual method requires approximately ten minutes to cut a panel, whereas apparatus constructed according to the present invention will cut the same panel in approximately 19 seconds. Accordingly, it is an object of the present invention to provide new and improved apparatus for shearing a contoured sheetmetal wall panel.

Flanged wall panels, of the type mentioned, frequently have at least one lateral flange which has a portion overlying a portion of the base of the panel. The portion of the overlying flange is relatively thin and, if unsupported, will flex from its normal position, when engaged by a shearing tool, and the flange will be inaccurately cut. Accordingly, it is an object of the present invention to provide new and novel sheetmetal shearing apparatus which incorporates adequate underlying support for all portions of a sheetmetal panel to be cut.

In panels of the type mentioned, it is customary to drill holes in the flanges to receive locking bolts which positively secure the interlocked flanges of adjacent panels to each other. In the past, it has been customary to hand-drill such holes. Accordingly, it is an object of the present invention to provide apparatus which will automatically punch a hole in the lateral flange of the panel, adjacent the end of the panel, when the sheetmetal panel is being sheared.

It is yet another object of the present invention to provide sheetmetal shearing apparatus which includes a die conforming to the contour of one side of the panel being cut and a blade which includes a plurality of teeth having sides which are inclined to the supporting surface of the die in such a manner as to tend to always urge the panel toward the die as it is being cut.

Other objects and dvantages of the present invention will become apparent as description thereof proceeds.

SUMMARY OF THE INVENTION

Apparatus constructed according to the present invention is provided for shearing a sheetmetal panel, and the like, which has a longitudinal base and a longitudinal flange along at least one lateral edge thereof having a portion overlying a portion of the base, said apparatus including a frame, a relatively movable panel supporting die means and cutting blade means supported on the frame and having opposed cooperating cutting edges which slide past each other to shear a panel supported therebetween, means for relatively moving the die means and blade means toward and away from each other, and flange support means mounted on said frame for movement between a remote, inoperative position when a panel is being placed on the die means and a position underlying a portion of said flange adjacent the cutting edges to support said flange as it is being sheared.

Other objects and advantages of the present invention will become apparent to those of ordinary skill in the art from the following description when considered in relation to the accompanying drawings in which:

FIG. 5 is a fragmentary, perspective view illustrating one of the flange supporting devices;

FIG. 6 is a fragmentary view illustrating the die supporting members, taken along the line 6—6 of FIG. 4;

FIG. 7 is a fragmentary view illustrating only a portion of the die supporting a panel thereon; and FIG. 8 is a fragmentary, schematic view particularly illustrating the relationship between the cutting edges of the panel supporting die and the cutting blade.

THE SHEETMETAL PANEL

Figure 1:
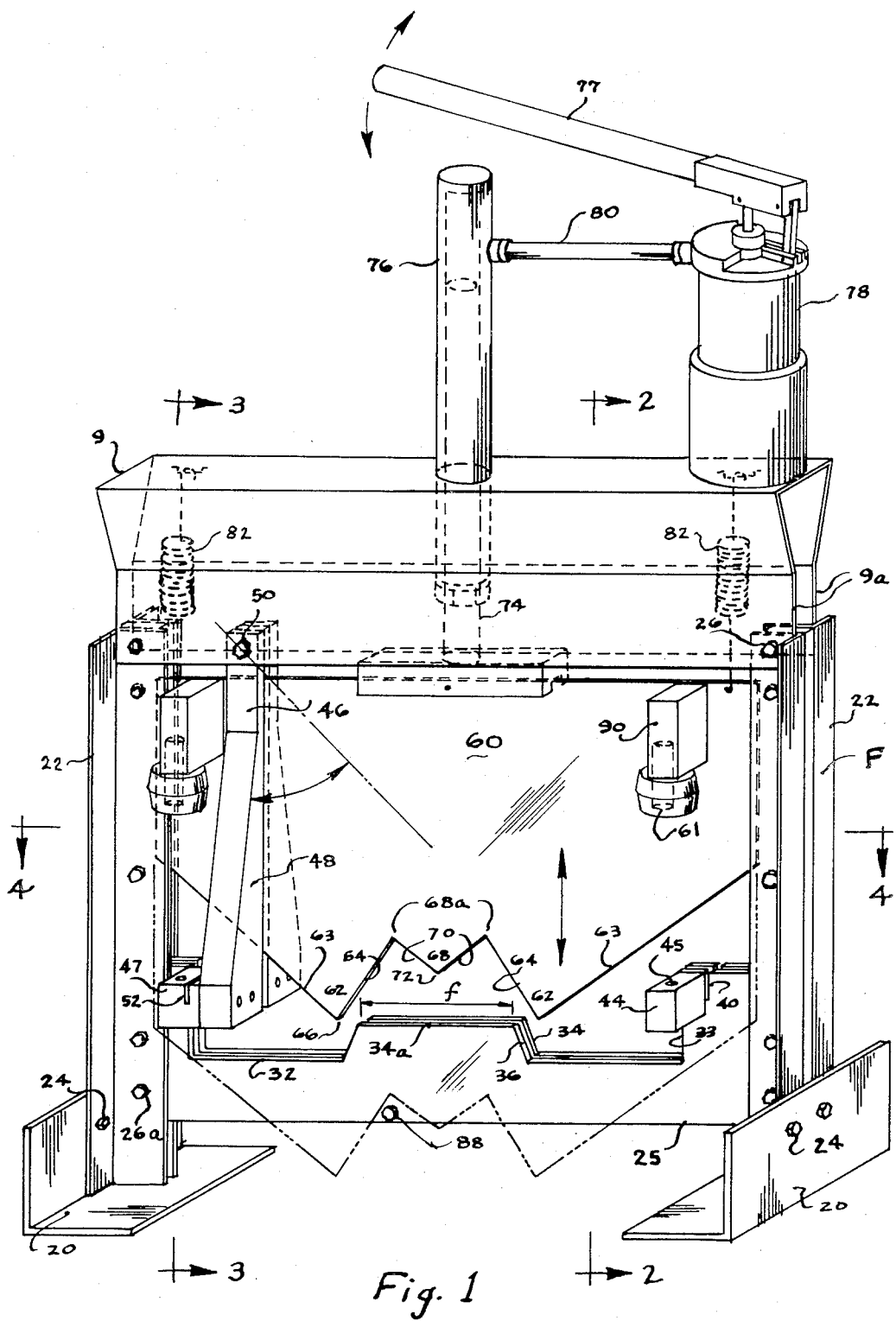
FIG. 1 is a perspective side view of sheetmetal shearing apparatus constructed according to the present invention.
Figure 2:
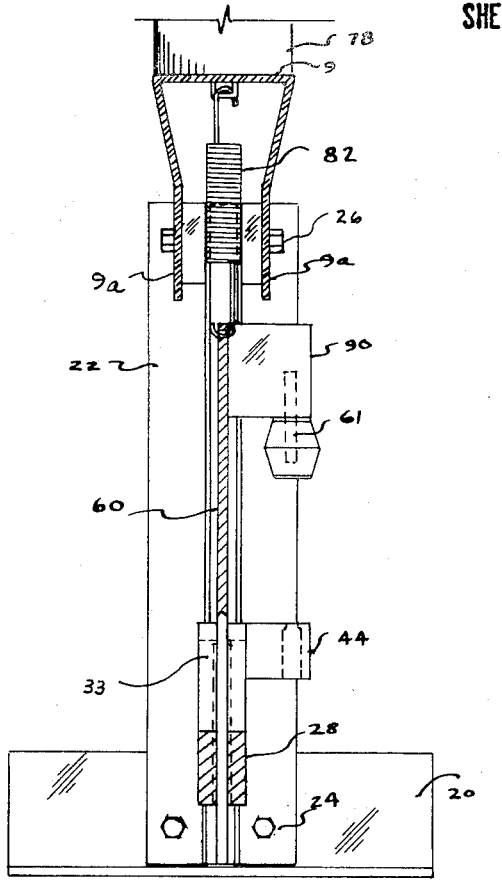
FIG. 2 is a vertical, sectional end view of the sheetmetal shearing apparatus, taken along the line 2—2 of FIG. 1.

Apparatus constructed according to the present invention is particularly well adapted for cutting a panel, generally designated 10 (FIG. 7), including a base portion 12 having a central, elongated rib or recessed portion, generally designated 14, having upstanding converging side walls 11 spanned by a mid-section 14a which together define an external longitudinal groove 13 that is trapezoidal in end cross-section. Marginal longitudinal flange portions, generally designated 15 and 16, are provided along the lateral edges of the panel 10 for interlocking adjacent panels to each other when they are installed. The recessed groove 13 provides an appropriate decorative effect and the dead air space between the recessed section 14 and the flange portions 15 and 16 enhances the insulating characteristics of a wall constructed with such panels. The flange portion 15 comprises a longitudinal, upstanding side wall 17 and a lateral portion 18 overlying a portion of the base 12 and terminating in a longitudinal transverse lip member 19. The opposite flange portion 16 includes an upstanding side wall 17' and a lateral portion 18' extending laterally outwardly of the wall 17' and having a generally perpendicular terminal lip portion 19'. When cut to proper lengths, the panels 10 are installed side-by-side and adjacent ones of the panel are interlocked by placing one of the U-shaped flange sections 15 within the U-shaped section 16 of the adjacent panel.

THE PANEL SUPPORTING DIE MEMBER

Apparatus constructed according to the present invention includes a frame, generally designated F, having a pair of base plates 20 supporting pairs of upstanding side frame members 22 rigidly secured to the base plates 20 by any suitable means, such as bolts 24. The side frame members 22 on each side of the machine are longitudinally spaced apart a distance $a$ (FIG. 3) and a die, generally designated 25, spans the lower ends of the members 22 on opposite sides of the machine. A generally inverted U-shaped main support member, or header, 9 spans the upper ends of the side frame members 22.

As is best illustrated in FIG. 6, the die 25 includes a pair of anvils 28, which are secured to frame members 22 by bolts 26a and are spaced apart a distance $b$. The anvils 28 include outer opposed cutting bar or shearing portions 29 spaced apart a distance $c$ which is substantially less than the distance $b$. The cutting bar portions 29 provide opposed cutting edges 29a. The enlarged space below the cutting bar members 29 permits the material severed in a manner to be later described, to easily pass.

The anvils 28 are shaped or cut to fit the contour of the underside of the panel 10, as illustrated in FIG. 7, and include horizontal support surfaces 32 which support the base portions 12 of the panel 10 and an upwardly extending portion 34 which generally corresponds to the trapezoidal outline of the panel groove 13. The support member 34 includes upstanding side walls 36 which are vertically inclined at substantially the same angle as the upstanding side walls 11 of the raised panel portion 14.

THE FLANGE SUPPORT MEMBERS

To ridigly support the interlockable flange portion 16 when it is cut, the anvil members 28 include longitudinally aligned slots 40 which receive the terminal lip portion 19' of the flange 16. Immediately adjacent one of the slots 40 is a flange-supporting block member 44 fixed to one of the anvils 28. The block 44 conforms to and is received snugly between the lip member 19' and the vertical wall 17' to provide vertical and lateral support therefore when the flange and side wall are being severed. A bore 45 is provided in the flange-supporting block 44 for a purpose to be described more fully hereinafter.

For supporting the flange 15 on the laterally opposite side of the panel 10 as it is being cut, is a flange-supporting member, generally designated 46, which comprises a pair of flange-supporting blocks 47 fixed to lower ends of a pair of support arms 48 pivotally mounted by pivot pins 50 on the opposed legs 9a of the U-shaped cross member 9. The support arms 48 are longitudinally spaced apart a distance $d$ (FIG. 3) which is substantially equal to, or only slightly greater than, the distance $c$ between the anvils 28. The flange-supporting blocks 47 include longitudinally aligned slots 52 which receive the panel lip portion 19 of the flange 15. Each of the portions 56 of the blocks 47 is of a width substantially equal to the distance between the flange 19 and the upstanding side wall 17 so as to be snugly received therebetween when a panel is being cut. A vertical bore 58 is provided in each block 47 for a purpose to be described more fully hereinafter.

The flange-supporting blocks 47 are movable from the solid line operative positions, illustrated in FIG. 1, to removed, operative chain line positions, also illustrated in FIG. 1, so that a panel 10 may be initially placed on the support anvils 28. The base portion 12 adjacent the flange 15 is initially raised slightly above the support surface 32 and the support blocks 47 are then swung from the chain line positions, shown in FIG. 1, to the solid line position also shown in FIG. 1, to underly the flange portion 15. The flange portion 15 is then lowered so that the lip 19 is received in the slots 52 and the horizontal portion 18 rests on the block portion 56.

THE SHEARING BLADE

A serrated shearing or cutting blade, generally designated 60, is provided and includes at its lower end, a pair of identical spaced apart teeth 62 and an intermediate tooth 68. The teeth 62 each have sides 63 and 64 converging downwardly to a sharp, panel-piercing edge 66. The tooth 68 has opposed downwardly converging sides 70, onverging to a sharp edge 72 which initially pierces the recessed portion 14a of the panel 10 to be cut prior to the sides 63 and 64 shearing the panel portion 14a. The blade 60 is supported for transverse movement on the frame F in a to-and-fro path of travel toward and away from the die by the piston rod 74 of a fluid operated cylinder 76. After the sharp panel-piercing edges 66 and 72 initially pierce the panel 10, the cutting edges 63 and 64 on opposite sides of the teeth 62 and cutting edges 70 on opposite sides of the tooth 68 exert oppositely directed cutting forces on the panel to simultaneously cut the panel in opposite lateral directions. A hand-operated fluid pump 78 is supported on the upper surface of the support 9 for pumping fluid through a conduit 80 to the upper side of the cylinder 76 to move the piston rod 74 downwardly from the inoperative, removed position, illustrated in solid lines in FIG. 1, to the shearing position, illustrated in chain lines in FIG. 1. A pair of coil springs 82 are supported between the cross member 9 and the blade 60 to return the blade 60 from the shearing position, illustrated in chain lines in FIG. 1, to the removed position, when fluid pressure is removed from the top side of the piston.

It is important to note that the oppositely inclined cutting tooth blade surfaces 64 are inclined relative to the die surfaces 36 and the oppositely inclined, cutting tooth blade surfaces 63 are inclined to the die surfaces 33 so as to always urge the panel 10 being cut toward the die 25 rather than away from the die 25 as the blade 60 is being lowered to cut a panel 10. As illustrated in FIG. 8, as the blade cutting surface 64 is cutting the upstanding wall 11, a transverse force 82 as well as a lateral force 84 is exerted on the upstanding portion 11. The force 84 is directed laterally toward the associated support surface 36. Similarly, a lateral force 86 is exerted on the upstanding wall portion 17' so as to move it toward the surface 33 as the blade 60 is cutting the panel. If the surface 64 were oppositely inclined, as illustrated at 64a (FIG. 8), the blade would exert an oppositely directed lateral force 84a tending to move the panel away from the die support surfaces 36.

The distance e between the roots 68a of the teeth 62 and 68 is substantially equal to, or no greater than, the width f (FIG. 1) of the upper panel support surface 34a and the width h (FIG. 7) of the raised section 14a. If the width e is greater than the distance f or h, the cutting surface 70 would tend to move the upstanding wall portions 11 away from the surfaces 36 as the wall portions 11 are being cut.

The tooth 68 is substantially shorter than the adjacent teeth 62 so that the sharp edges 66 and 72 substantially simultaneously engage the base and raised sections 12 and 14 respectively. Also a bracket 88 is provided directly under the edge 72 of the middle tooth 68 to clamp the anvils 28 together. The sheared panel portions on laterally opposite sides of the cutting edge 72 will drop on laterally opposite sides of the bracket 88. By providing a plurality of teeth 62 and 68, the stroke of the piston 74 can be substantially reduced.

When panels 10 are installed adjacent each other, the flanges 15 and 16 of adjacent panels are fitted together. Holes must be provided in the horizontal portions 18 and 18' of flanges 15 and 16 adjacent the ends of the cut panels, to receive bolts for rigidly locking adjacent panels together. To provide such holes in the flanges, a pair of laterally spaced apart punch mounting blocks 90 are supported on one face of the blade 60 and each mounts a depending punch 61 which is received in the bores 45 and 58 in the flange support blocks 44 and 47 respectively. Holes can thus be punched in the flange walls 18 and 18' at the same time the ends are being cut from the panel 10.

Figure 3:
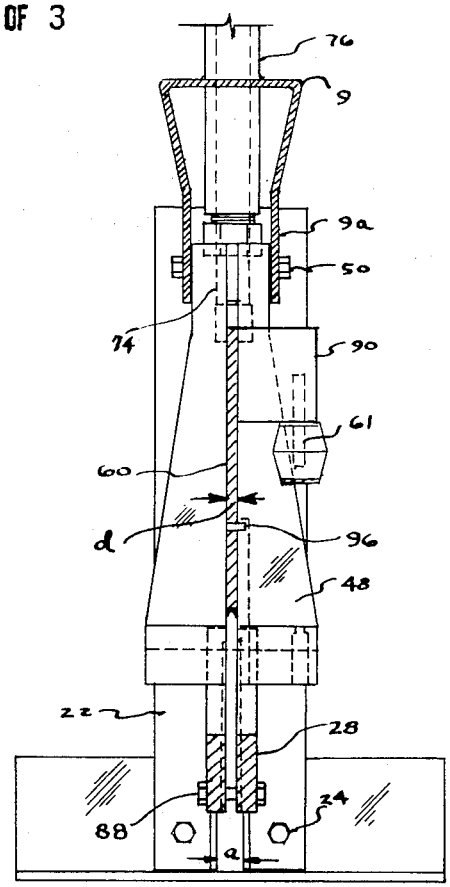
FIG. 3 is a sectional, end view of the apparatus taken along the line 3—3 of FIG. 1.
Figure 4:
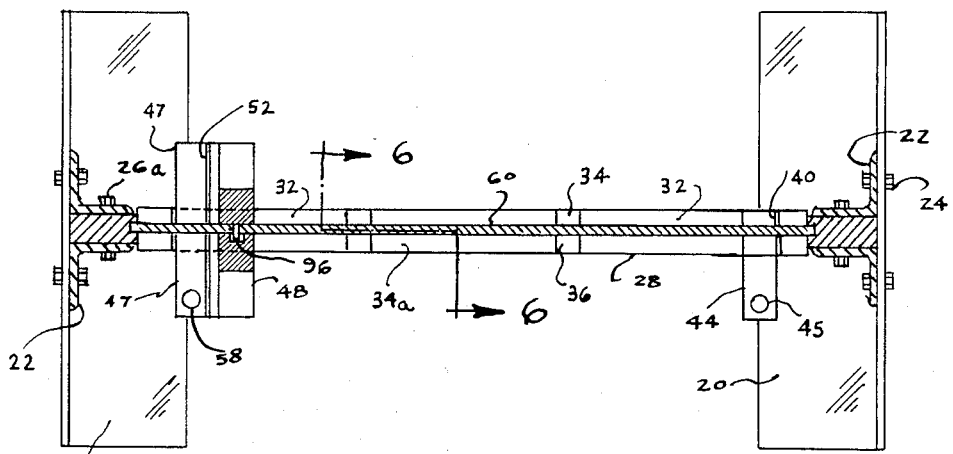
FIG. 4 is a top plan, sectional view taken along the line 4—4 of FIG. 1.

As is best illustrated in FIGS. 3 and 5, the blade 60 mounts a guide or locking pin 96 which is received in a downwardly tapering slot 97a cut into one of the arms 48. The pin 96 wedges against the wall 97b of the slot 97a to wedge or bias one of the arms 48 laterally outwardly and fix or lock it in a stationary position so that the punch 62 is in vertical alignment with bore 58 in flange support block 47 and to prevent movement thereof when the panel is being sheared.

THE OPERATION

The blade 60 is initially palced in the position illustrated in FIG. 1, and the flange-supporting blocks 47 are swung about the pivot pin 50 to the raised, chain line positions illustrated in FIG. 1. A panel 10 is initially placed on the support die 25 such that the lip 19' is received in the slots 40. The flange portion 15 is raised slightly so that the base portion 12 adjacent thereto is raised slightly off the support surface 32 and the arms 48 are then swung downwardly to the solid line positions illustrated in FIG. 1 beneath the flange 15. The panel 10 is then permitted to drop so that the lip 19 is received in the slot 52. The hand-operated lever 77 is then actuated to pump fluid into the cylinder 76 so as to lower the piston 74 and the blade 60 from the solid line position, illustrated in FIG. 1, to the chain line position, illustrated in FIG. 1. The locking pin 96 locks the block 47 in the outer, punch receiving position.

The sharp edges 66 and 72 initially pierce the base members 12 and the raised section 14a. As the blade 60 continues downwardly, opposite sides 63 and 64 of the teeth 62 and sides 70 of tooth 68, exert oppositely directed cutting forces on the panel to remove a strip of material having a width c which is permitted to free-fall between the lower portions of the anvils 28. Initially, the teeth 62 and 68 cut, in opposite directions, along only six areas 101, 102, 105, 106, 109 and 110. When the blade reaches the lower position illustrated in FIG. 8, the surfaces 63, 64 and 70 are cutting at 10 areas designated 98, 99, 100, 103, 104, 107, 108, 111, 112 and 113. Although a total of ten areas are being cut, only a very small length of sheetmetal, i.e., three-sixteenths inch, is cut at any one time. In practice, the blade 60 may suitably be one inch thick to substantially remove a 1 inch strip of material and 2 ton of force is applied by the piston 76 so that considerable cutting pressure is exerted on the relatively small cutting area. As the blade 60 reaches the end of its stroke, the punch members 61 pass through the horizontal portions 18 and 18' of the flanges 15 and 16 and are received in the bores 45 and 58 of the blocks 44 and 47. The pressure is then relieved on the upper side of the piston rod 74 and the springs 82 return the blade to the solid line position, illustrated in FIG. 1, so that another panel may be inserted into position, and the operation repeated.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. Apparatus for cutting a sheetmetal panel, including a base and a longitudinal flange along at least one lateral edge thereof having a portion in juxtaposition with a portion of said base, and the like, comprising:

a die conforming to the contour of one side of a sheetmetal panel to be cut and including a pair of longitudinally spaced apart anvils for supporting said panel;

serrated cutting blade means transversely movable in a to-and-fro path between an inoperative position removed from said die and an operative position between and in wiping engagement with said anvils to initially pierce said base and then simultaneously laterally shear said panel in laterally opposite directions to remove a strip from said panel; and flange support means is provided for supporting said flange and is movable between a raised inoperative position, when the panel is being positioned on the die, and a lowered, operative position underlying said juxtaposed portion of said flange to support said flange when said blade means moves in said to-and-fro path.

2. The apparatus set forth in claim 1 wherein said overlying portion includes a terminal lip portion generally perpendicular to said base portion; said flange supporting portion includes a longitudinal slot for receiving said lip portion.

3. Apparatus for cutting a sheetmetal panel, and the like, comprising:

a die conforming to the contour of one side of a sheetmetal panel to be cut and including a pair of longitudinally spaced apart anvils for supporting said panel; and serrated cutting blade means transversely movable in a to-and-fro path between in inoperative position removed from said die and an operative position between and in wiping engagement with said anvils to initially pierce and then simultaneously laterally shear said panel in laterally opposite directions to remove a strip from said panel;

said anvils including outer panel supporting portions which are spaced from each other a predetermined distance and are engageable by said blade means to cut a strip from said panel, and inner recessed portions which are spaced apart a predetermined greater distance for freely receiving the removed strip.

4. The apparatus set forth in claim 3 wherein said blade means includes a plurality of laterally spaced apart teeth each having sides which converge laterally to a sheetmetal piercing portion; and means is provided for moving said blade means toward said die to initially pierce said panel with said piercing portions and then simultaneously laterally shear said panel in laterally opposite directions with the laterally opposite sides of each tooth.

5. The apparatus set forth in claim 4 wherein said sheetmetal panel includes a base and upstanding portions; said die conforming to the contour of one side of said upstanding portions; said blade means including means for simultaneously severing said base and said upstanding portions.

6. Apparatus for shearing a sheetmetal panel, and the like, which has a longitudinal base and a longitudinal flange having a portion in juxtaposition with said base, comprising:

a frame;

relatively movable panel supporting die means and cutting blade means supported on said frame and having opposed cooperating cutting edges which slide past each other to shear a panel supported herebetween;

means for relatively moving said die means and said cutting blade means toward and away from each other; and flange support means mounted on said frame for movement between a remote inoperative position, to permit a panel to be positioned on the die means, and a position juxtaposed with a portion of said flange immediately adjacent said cutting edges to support said flange portion as said flange is being sheared.

7. The apparatus set forth in claim 6 wherein said flange support means comprises support blocks fixed to support arms swingably mounted on opposite sides of said cutting blade means.

8. The apparatus set forth in claim 7 wherein said blocks include longitudinal slots for receiving the terminal ends of said flanges.

9. The apparatus set forth in claim 7 including means on said swingable arm means and said blade means cooperating to bias said support arms laterally outwardly when said blade means and die means relatively moving toward each other to lock said arm means in a stationary position.

10. The apparatus set forth in claim 6 including punch means on one of said die and cutting blade means and punch receiving means on the other of said die and cutting blade means for engaging opposite sides of said panel and punching an opening in said flange adjacent the end of the panel when said die and cutting blade means are relatively moved toward each other.

11. Apparatus for shearing a sheetmetal panel, and the like, which has a longitudinal base and a longitudinal flange having a portion in juxtaposition with said base comprising:

a frame;

relatively movable panel supporting die means and cutting blade means supported by said frame and having opposed cooperating cutting edges which slide past each other to shear a panel supported therebetween; and punch means on one of said die means and cutting blade means and cooperating punch receiving means on the other of said die means and cutting blade means for engaging the opposite sides of said panel and punching an opening in said flange adjacent the portion of the panel being sheared when said die means and cutting blade means are relatively moved toward each other to shear said sheetmetal panel.

12. The apparatus of claim 11 wherein said punch receiving means is mounted on the frame for movement between a removed position and an operative position juxtaposed with a portion of the panel to be cut, and means responsive to movement of said punch means for moving said punch receiving means to said operative position.

13. The apparatus of claim 11 wherein said punch receiving means is movably mounted on said frame between a remote inoperative position and an operative position juxtaposed with the flange immediately adjacent said blade means.

14. Apparatus for shearing a longitudinal sheetmetal panel and the like, including a recessed portion, said apparatus comprising:

a frame;

panel supporting die means on said frame having support portions juxtaposed with and conforming to the contour of said recessed portions of the panel being sheared;

blade means mounted on said frame adjacent said die means for transverse movement toward and away from each other to shear a panel placed therebetween;

said blade means including a plurality of teeth each having converging sides which exert oppositely directed cutting forces on said panel; said converging sides being inclined relative to said support portions such that the lateral component of said cutting force is always directed toward said support portions to urge the portion of the panel being cut toward said support portions.

15. The apparatus set forth in claim 14 wherein said support portions comprise a support member having converging side walls spanned by a support member, said plurality of teeth including two lateral teeth and a middle tooth disposed between said lateral teeth, the width of said middle tooth at its widest portion being no greater than the lateral width of said support member.

16. Appratus for cutting a contoured sheetmetal panel, and the like, comprising:

a die conforming to the contour of one side of a sheetmetal panel to be cut and including a pair of longitudinally spaced apart anvils for supporting said panel; and serrated cutting blade means transversely movable in a to-and-fro path between an inoperative position removed from said die and an operative position between and in wiping engagement with said anvils to initially pierce said base and then simultaneously laterally shear said panel in laterally opposite directions to remove a strip from said panel;

said anvils comprising a main support portion and a transversely projecting portion for supporting portions of said panel at different transverse levels; said blade means including a plurality of teeth terminating at different transverse levels and aligned with said main support portion and said transversely projecting portion such that said teeth substantially concurrently engage the portions of the panels supported at said different transverse levels.

17. Apparatus for cutting a sheetmetal panel, and the like, including a longitudinally extending base, and longitudinally extending side wall members on opposite sides of said panels, one of said wall members having a laterally inwardly directed flange juxtaposed with said base and the other wall member having a laterally outwardly directed flange, comprising:

a die conforming to the contour of one side of said sheetmetal panel to be cut and including a pair of longitudinally spaced apart anvils for supporting said flanges; and serrated cutting blade means transversely movable in a to-and-fro path between an inoperative position removed from said die and an operative position between and in wiping engagement with said anvils to initially pierce said base and then simultaneously laterally shear said base and said flanges, to remove a strip from said panel.

* * * * *

UNITED STATES PATENT OFFICE
CERTIFICATE OF CORRECTION

Patent No. 3,771,401　　　　　　Dated November 13, 1973

Inventor(s) Donald W. Jasinski

It is certified that error appears in the above-identified patent and that said Letters Patent are hereby corrected as shown below:

Column 1, line 68, change "dvantage" to -- advantages --.

Column 4, line 8, change "operative" to -- inoperative --.

Column 4, line 28, change "onverging" to -- converging --.

Column 5, line 45, change "palced" to -- placed --.

Column 6, line 66, change "in" to -- an --.

Column 8, line 57, change "Appratus" to -- Apparatus --.

Signed and sealed this 2nd day of April 1974.

(SEAL)
Attest:

EDWARD M. FLETCHER, JR.　　　　　C. MARSHALL DANN
Attesting Officer　　　　　　　　Commissioner of Patents